United States Patent
Western

[11] 3,814,372
[45] June 4, 1974

[54] OPEN-TOP SHELL MOLDING APPARATUS

[76] Inventor: William John Taylor Western, 4 Elston Ave., Denistone, N.S.W., Australia

[22] Filed: June 21, 1972

[21] Appl. No.: 265,009

[30] Foreign Application Priority Data
June 22, 1971 Australia............................ 5261/71
June 29, 1971 Australia............................ 5353/71
June 23, 1971 Australia............................ 5654/71

[52] U.S. Cl. ............................................. 249/65
[51] Int. Cl. ............................................. B28b 7/32
[58] Field of Search ......... 249/65, 127, 183, 10, 11, 249/27, 133, 134; 425/61, 62, 63, 383, 403, 440, 51, 58, 59, DIG. 44; 61/38; 264/33, 313, 314, 315, 316; 9/6, 6.5

[56] References Cited
UNITED STATES PATENTS

| | | | |
|---|---|---|---|
| 2,342,988 | 2/1944 | Vidal | 264/316 X |
| 2,343,005 | 2/1944 | Gardner | 249/65 |
| 3,118,010 | 1/1964 | Harrington | 264/314 X |
| 3,139,464 | 6/1964 | Bird | 249/65 |
| 3,344,007 | 9/1967 | Skoggard | 264/314 X |
| 3,425,228 | 2/1969 | Lamberton | 249/10 |
| 3,486,341 | 12/1969 | Huesker-Stiewe | 249/10 X |
| 3,598,357 | 8/1971 | McLean | 249/65 |
| 3,619,432 | 11/1971 | Harrington | 249/65 X |
| 3,643,910 | 2/1972 | Heifetz | 249/65 |

Primary Examiner—J. Spencer Overholser
Assistant Examiner—John S. Brown
Attorney, Agent, or Firm—Browne, Beveridge, DeGrandi, & Kline

[57] ABSTRACT

This invention is directed to a moulding apparatus for use in the formation of open-top bowl-like shells wherein at least some of the external surface is curved, which comprises a pliant form layer, which form layer may assume the shape required of said external surface; a top rail member which conforms to the shape required of the shell rim bordering said curved surface and to which the upper edge of said top rail member in conformity with said required rim shape; a pliant envelope spaced from and externally surrounding the form layer, wherein said pliant envelope with said form layer form at least one enclosure; and means to vary the fluid pressure within said enclosure.

10 Claims, 4 Drawing Figures

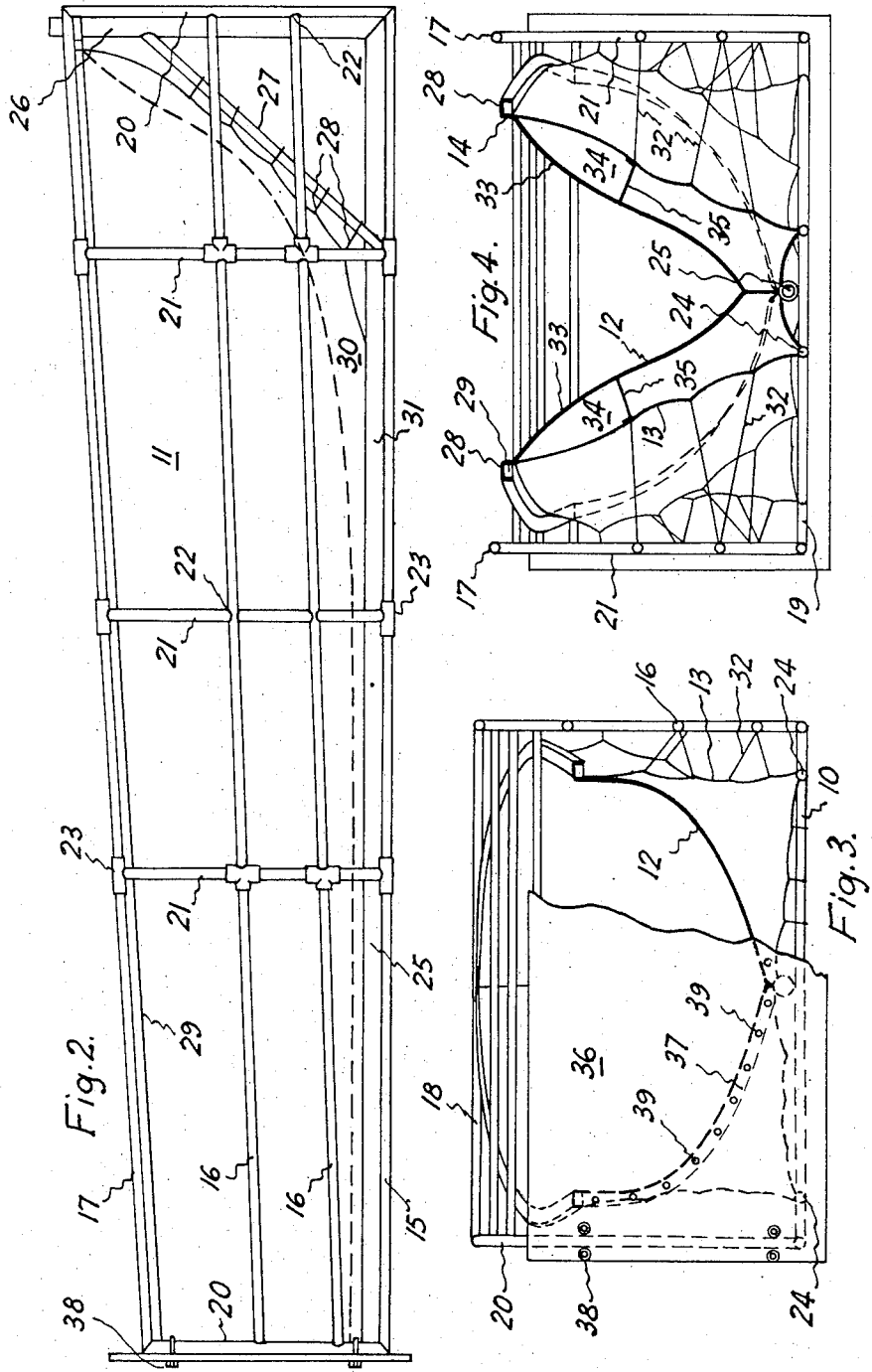

OPEN-TOP SHELL MOLDING APPARATUS

This invention relates to moulding apparatus of the type used for the moulding of products from such materials as plastics, ferro-cement and other materials which may be applied to a mould surface and subsequently hardened. The invention has particular application to moulds suitable for use in the manufacture of boat hulls and superstructure, car bodies, and furniture.

Moulding devices most commonly used at present are constructed to provide a mould surface of fixed configurations and dimensions, and of rigid construction. As a consequence of this the mould is generally of much the same dimensions as the article to be moulded, and this results, particularly in such fields as boat building and motor car body constructions, in large unwieldy structures which are difficult and expensive to transport and store.

The present invention has for its object the provision of moulding apparatus which can be collapsed into a compact form for ease of transportation and storage, but which is capable of assuming sufficiently rigid configuration for the moulding of large as well as small objects.

This object is achieved by the present invention by means of the provision of a flexible mould which may be converted into a substantially rigid mould by the use of differential fluid pressure in association with a supporting frame work.

Of course the use of flexible mould surfaces supported by fluid pressure is known in the prior art, but the use of this technique has been limited to simple shapes, like pipe cores. The prior art has not provided satisfactory moulds of complicated shape where the entire moulding apparatus is simple to assemble and use, without requiring anything but simple tools.

In accordance with the present invention in its broad form such moulding apparatus contains a mould surface of flexible inelastic material formed to the substantial configuration of the mould surface to be obtained. Said mould surface constituting part of the outer surface of a sealed or sealable enclosure of flexible material adapted to be mounted within a frame, and means for attaching salient regions of said mould surface to said frame.

In accordance with a preferred form of the invention the apparatus comprises means for attaching the remaining surface of the said flexible enclosure to said frame, and means for reducing within said enclosure, a pressure of air or other fluid which differs from the pressure of air or other fluid exerted upon said mould surface.

As will become clear from the following description of the invention, the pressure of air within the enclosure may be reduced or increased, depending upon the mould configuration which is to be obtained.

In a further preferred form of the invention, sealed regions are provided between that portion of the enclosure forming the mould surface and adjacent portions of the remainder of the enclosure, and means are provided for controlling the pressure of air or other fluid within which such sealed region, in order to produce local modifications of the contour of the mould surface.

In a particularly convenient and preferred embodiment of the present invention, a reduction of pressure within the enclosure is obtained by drawing away from the portion of the enclosure forming the mould surface, the remaining portion of the flexible enclosure, thereby to increase the volume of the enclosure.

To facilitate the proper understanding of the present invention, and to enable it to be readily put into practice, it will now be described by way of example with reference to the accompanying drawings in which:

FIG. 2 shows side elevation of the example illustrated in FIG. 1;

FIG. 3 shows a partly sectioned rear end elevation taken on the line 3—3 of FIG. 1; and FIG. 4 shows a section taken on the lines 4—4 of FIG. 1.

Figure 1:
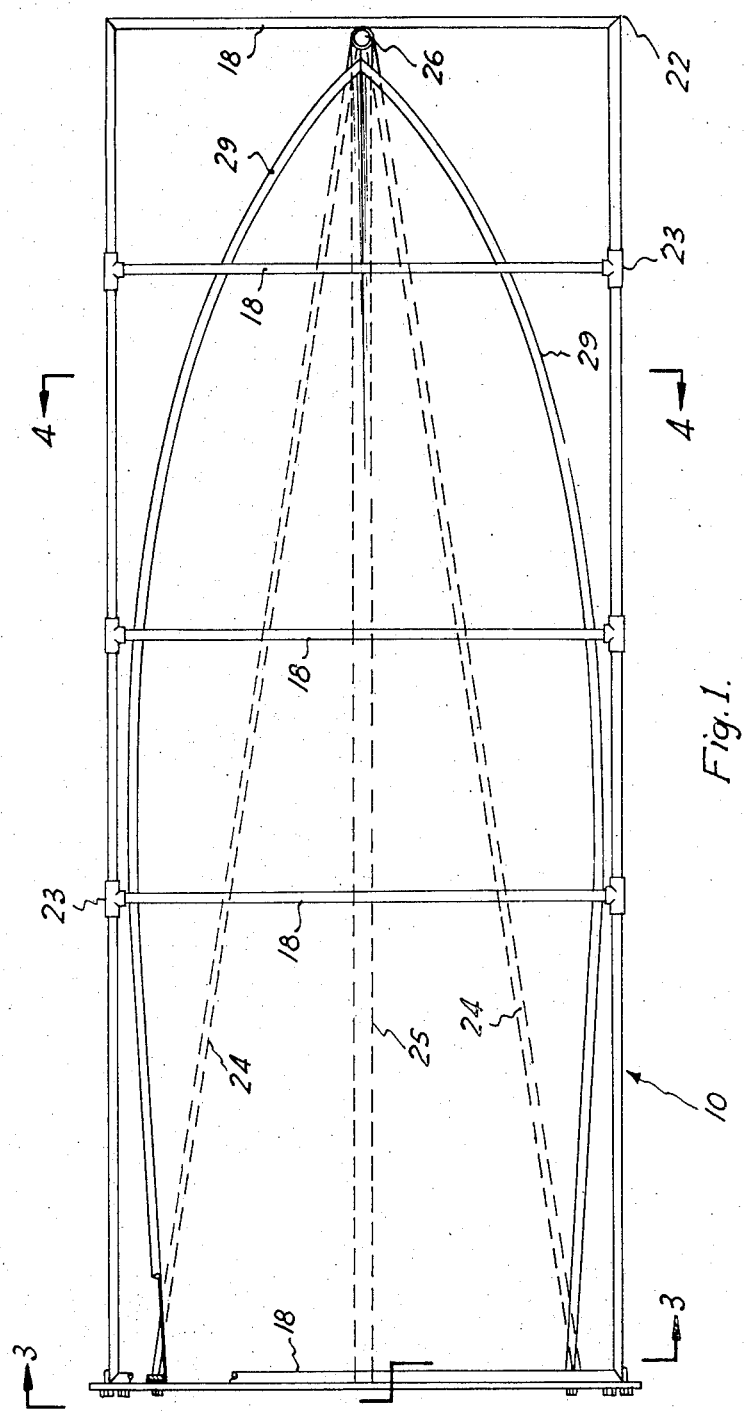
FIG. 1 shows a plan view of a flexible enclosure and mould, together with its accompanying frame, for the manufacture of a boat hull.

The drawings show an assembly for moulding a boat hull in fibre glass. Within a tubular steel frame 10 there is supported a sealed enclosure 11 of flexible and substantially inelastic plastics material. This enclosure consists of an inner surface portion 12 constituting the surface on which the boat hull is to be formed, and therefore referred to below as the mold surface, and an outer cover 13.

The mould surface 12 is formed so as to provide the correct mould contour when maintained in a substantially rigid condition by providing an air pressure on the mould surface 12 which is greater than the air pressure existing in the interior of the enclosure 11. The mould surface 12 is cut from plastics sheet material using a pattern developed and projected from drawings of the hull. The pattern is cut in a number of sections to take into account variations of curvature from one part of the hull to another, and these sections ajoined (with butt joints) to form the complete moulding surface. Subsequently the flexible cover 13 is sealed to the free edge of the mould surface, in this case along the bulwark line 14.

It will be observed from the hull cross-sections shown in FIGS. 3 and 4 that the hull, and therefore the mould surface 12, includes sections having both concave and convex curvature. The means by which the mould surface 12 is constrained to follow these curvatures will be explained below.

The tubular frame 10, assembled for the support of the mould from readily knocked-down elements and therefore, like the mould itself, suitable for transport and storage, is constructed from tubular steel side rails 15, 16, 17; upper cross rails 18 and corresponding lower cross rails 19, corner posts 20, and side posts 21. These elements are formed into demountable sections, as will be clear from the system of welded joints 22 and demountable tee socket couplings 23 shown in FIGS. 1 and 2. The frame is thereby formed in a number of convenient sub-assemblies enabling it to be speedily erected and disassembled. The basic frame structure is completed by a pair of bracing members 24 extending between the members 19 at bow and stern.

Mounted within the frame 10 is a tubular keel rail 25 which extends longitudinally along the axis of the frame, and is fixed at either end to the respective lower cross members 19 at bow and stern. An upright post 26 is welded to the keel rail 25 at the end of the frame supporting the bows of the hull mould, and this post 26 is fixed to the frame at its upper end. A sloping bows stem support 27 extends between the members 25 and 26.

The mould surface 12 is formed with an integral extension in the form of a continuous tab 28 around its bulwark line 14, and is fixed by means of this extension 28, to a pair of bulwark rails 29 which are fixed (by means not shown) to, and which lie immediately below, the upper cross members 18. These bulwark rails 29 maintain the uppermost edge of the mould surface in its correct position and shape.

A similar continuous tab-like extension 30 is provided along the keel line of the hull, and the outer free edge of this extension is fixed to the keel rail 25, most conveniently by the provision of a tubular formation 31 at the edge, through which the keel rail 25 is passed. At the bows, this extension 30 is fixed to the stem support 27 by means of ties 28.

The outer cover 13 of the enclosure is restrained in its position by means of ties 32 which are attached to the side rails 16, the lower longitudinal members 24, and the rearmost bottom cross-member 19.

In FIG. 3 there is illustrated the means by which the transom of the mould is attached to the rear of the frame 10. A plate 36 is employed, fixed to the frame end by U-bolts 38 and the continuous tab extensions provided around the stern edges of the mould are fixed to the inner surface of this plate by means of battens 37 bolted or screwed to the plate at 39.

The shape and contours of the mould surface 12 is maintained, as has been indicated above, by providing a fluid pressure difference between the mould surface and the interior of the enclosure 11. In the embodiment illustrated, this fluid is air, and the pressure difference is basically provided by a reduction in the pressure in the enclosure to a level below atmospheric. Where the article to be moulded requires a male mould, rather than a female mould as shown here, then the basic pressure differential is created by increasing to a level above atmospheric, the pressure within the enclosure 11.

It will be appreciated that reduction of the pressure within the enclosure 11 cannot, in the case of a female mold such as that illustrated, give a convex mould surface such as that required in the region 33 in FIG. 4. At such areas auxiliary means must be provided to obtain the correct contour, and in the illustrated embodiment this auxiliary means consists of sealed portions 34 of the enclosure 11, in which the air pressure is increased by the introduction of air under pressure through a valve (not shown). Such sealed chambers 34 are created by flexible walls 35 extending between the adjacent inner surfaces of the enclosure 11.

The means of obtaining a reduction in the pressure of air within the enclosure 11 may of course consist of an exhaust pumps and suitable valve arrangements. In accordance with a preferred form of the present invention, however, the reduction of pressure is achieved by manually exhausting the major portion of air from the enclosure (for example immediately before the sides 12 and 13 are sealed to form the enclosure) and, upon the mounting of the enclosure 11 in the frame 10, drawing the cover 13 outwardly away from the mould surface 12, by means of the ties 32. This has been found to be an entirely satisfactory way of achieving the desired pressure reduction, and the simplicity and economy which is realized by its use will be readily seen.

The invention thus provides a moulding apparatus which is simple in its construction and use, and which is easily assembled from components which are themselves light and non-bulky. The mould may be re-used, and its ease of assembly and disassembly makes it well adapted for transport between moulding jobs.

It will be appreciated that the invention is susceptible to many modifications of detail, over what has been fully described and illustrated herein. Thus the enclosure and frame may be designed to allow different sections to be inserted or removed, enabling similar objects of different sizes to be moulded without unnecessary duplication of equipment. The mould surface contours may be more complicated than that illustrated herein, and a greater number of sealed chambers within the enclosure may be employed, with varying pressures or pressure reductions, to achieve greater variability of the surface shape.

Different sections may be inserted into or removed from the enclosure by the provision, along their edges, of slide fasteners. The slide fasteners may be sealed by means of a strip of material provided with pressure-sensitive adhesive.

In one particularly convenient modification of this general nature, the entire mould surface may be attached to the remainder of the enclosure by such a slide fastener. This is particularly advantageous in the case of boat hull moulds of the general type illustrated herein, where such a slide fastener would be provided around the gunwale line 14.

In many cases it is desirable to provide flat mould surface regions adjacent to curved regions. In such cases these flat areas may be provided by attaching a rigid number of the appropriate dimensions to the mould surface, or by locating it within a pocket formed in the mould surface. Alternatively the material of the mould in the relevant region may be treated, for example by the application of a suitable hardenable material.

The transom area of the boat hull mould apparatus illustrated is a case in point. This flat mould surface area may be pre-formed by fixing to the inner surface of the mould surface material, a sheet of rigid material such as compressed particle board. Alternatively such a sheet may be located in a pocket formed by a second wall of the enclosure material.

The material employed for the enclosure, or at least for the mould surface thereof, is preferably a plastics laminate of a rectangular mesh consisting of nylon, fibre glass or the like, with a flexible non-porous plastics material. The use of such a laminate assists in the production of a satisfactory mould surface by cutting and joining as described above.

In some cases it may be found desirable to apply a controlled tension to the material of the mould surface in order that the contour of that surface is exactly that desired, and in the case of the boat hull mould illustrated herein, to ensure that the gunwale and stem are symmetrical about the centre-line. For this purpose, those two ties such as the ties 28 in FIG. 2, which apply tension directly to the mould surface, may be made adjustable in length.

I claim:

1. A moulding apparatus for use in the formation of an open-top bowl-like shell whereof at least some of the external surface is curved, comprising:
   a. a pliant, inelastic form layer which when tensioned both longitudinally and laterally assumes the shape required of the said external surface;
   b. a top rail member which conforms to the shape required of the shell rim bordering said curved surface and to which the upper edge of said form layer is attached;

c. means to fixedly support said top rail member in conformity with said required rim shape;

d. a pliant envelope spaced from and externally surrounding said form layer thereby to define with said form layer at least one enclosure;

e. means to vary the fluid pressure within said enclosure so that the fluid pressure on the moulding face of said form layer is different from that on its opposite face thereby to bulge said form layer into a condition of tensed stiffness.

2. A moulding apparatus for use in the formation of an open-top bowl-like shell whereof at least some of the external surface is curved, comprising:

a. a pliant, inelastic form layer which when tensioned both longitudinally and laterally assumes the shape required of the said external surface;

b. a top rail member which conforms to the shape required of the shell rim bordering said curved surface and to which the upper edge of said form layer is attached;

c. a bottom rail member to which the lowermost portion of said form layer is attached;

d. means to fixedly support said top rail member in conformity with said required rim shape;

e. means to fixedly support said bottom rail member in relation to said top rail member;

f. a pliant envelope spaced from and externally surrounding said form layer so as to define with said form layer at least one enclosure, said envelope having its top edges secured to said top rail member and a bottom portion secured to said bottom rail member; and g. means to vary the fluid pressure within said enclosure so that the fluid pressure on the moulding face of said form layer is different from that on its opposite face thereby to bulge said form layer into a condition of tensed stiffness.

3. Moulding apparatus as claimed in claim 2, wherein separate sealed chambers are formed within said enclosure between the inner side of said mould surface and the opposed inner side of the remainder of said enclosure, such chambers extending over a defined region of said mould surface, and means for controlling the fluid pressure within said chambers, thereby to modify the contour of said mould surface.

4. Moulding apparatus as claimed in claim 2, wherein said means for controlling the fluid pressure within the enclosure comprises means for varying the volume of the enclosure.

5. Moulding apparatus as claimed in claim 4 wherein said means for varying the volume of the enclosure comprises adjustable means attaching the remaining surface of said enclosure to said frame.

6. Moulding apparatus as claimed in claim 2 wherein the said enclosure includes sections which may be removed or inserted thereby to alter the contour of at least part of the mould surface.

7. Moulding apparatus as claimed in claim 6 wherein the mould surface is removably attached to the remainder of the enclosure.

8. Moulding apparatus as claimed in claim 2 wherein said mould surface includes rigid areas of fixed contour adjacent flexible regions thereof.

9. Moulding apparatus as claimed in claim 2 wherein means are provided for the application and control of tension in the material of said mould surface.

10. Moulding apparatus as claimed in claim 9 wherein said means is provided by the means for attachment of said enclosure to said frame.

* * * * *